US 8,069,072 B2
Nov. 29, 2011

(12) United States Patent
Ingman et al.

(10) Patent No.: US 8,069,072 B2
(45) Date of Patent: Nov. 29, 2011

(54) METHODS, SYSTEMS, AND COMPUTER-READABLE MEDIA FOR PROVIDING AN INDICATION OF HIGHTIME

(75) Inventors: Robert Ingman, Peachtree City, GA (US); Robert Cole, Birmingham, AL (US); Richard Miller, Hoover, AL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 966 days.

(21) Appl. No.: 11/779,054

(22) Filed: Jul. 17, 2007

(65) Prior Publication Data

US 2009/0024455 A1  Jan. 22, 2009

(51) Int. Cl.
*G06Q 10/00* (2006.01)

(52) U.S. Cl. ............... 705/7.13; 705/7.15; 705/7.16; 705/7.11

(58) Field of Classification Search ........ 705/7.11–7.17; 340/286.01
See application file for complete search history.

(56) References Cited

U.S. PATENT DOCUMENTS

| | | | |
|---|---|---|---|
| 4,509,123 A | | 4/1985 | Vereen |
| 4,937,743 A * | | 6/1990 | Rassman et al. .............. 705/7.22 |
| 5,155,689 A | | 10/1992 | Wortham |
| 5,214,281 A | | 5/1993 | Rowe |
| 5,467,268 A * | | 11/1995 | Sisley et al. ................... 705/7.16 |
| 5,515,510 A | | 5/1996 | Kikinis |
| 5,542,088 A | | 7/1996 | Jennings, Jr. et al. |
| 5,590,269 A | | 12/1996 | Kruse et al. |
| 5,615,121 A | | 3/1997 | Babayev et al. |
| 5,623,404 A | | 4/1997 | Collins et al. |
| 5,751,450 A | | 5/1998 | Robinson |
| 5,757,290 A | | 5/1998 | Watanabe et al. |
| 5,758,264 A | | 5/1998 | Bonta et al. |
| 5,778,345 A | | 7/1998 | McCartney |
| 5,920,846 A * | | 7/1999 | Storch et al. .................. 705/7.14 |
| 5,943,652 A * | | 8/1999 | Sisley et al. ................... 705/7.25 |
| 5,963,911 A * | | 10/1999 | Walker et al. ................. 705/7.12 |
| 5,987,377 A | | 11/1999 | Westerlage et al. |
| 6,006,171 A | | 12/1999 | Vines et al. |
| 6,078,255 A * | | 6/2000 | Dividock et al. .......... 340/539.1 |
| 6,134,530 A | | 10/2000 | Bunting et al. |
| 6,415,259 B1 * | | 7/2002 | Wolfinger et al. ............ 705/7.13 |

(Continued)

FOREIGN PATENT DOCUMENTS

EP  1139247  10/2001

OTHER PUBLICATIONS

"MDSI Mobile Data Solutions—Innovative and effective mobile workforce management and wireless connection", 1998, www.mdsi-advantex.com, pp. 1-31.

(Continued)

*Primary Examiner* — Lynda Jasmin
*Assistant Examiner* — Alan S. Miller
(74) *Attorney, Agent, or Firm* — Hope Baldauff Hartman, LLC (57) ABSTRACT

Methods, systems, and computer-readable media provide for providing an indication of hightime. According to embodiments, a method for providing an indication of hightime is provided. According to the method, whether at least one of a plurality of technicians exceeds an allotted time with which to complete a job is determined. In response to determining that at least one of the plurality of technicians exceeds the allotted time, an indication that at least one of the plurality of technicians exceeds the allotted time is provided.

14 Claims, 6 Drawing Sheets

U.S. PATENT DOCUMENTS

| | | | |
|---|---|---|---|
| 6,445,968 B1* | 9/2002 | Jalla | 700/101 |
| 6,578,005 B1* | 6/2003 | Lesaint et al. | 705/7.14 |
| 6,633,900 B1* | 10/2003 | Khalessi et al. | 709/202 |
| 6,684,136 B2 | 1/2004 | Sinex | |
| 6,889,196 B1* | 5/2005 | Clark | 705/7.12 |
| 6,904,408 B1 | 6/2005 | McCarthy et al. | |
| 6,934,379 B2 | 8/2005 | Falcon et al. | |
| 6,941,514 B2 | 9/2005 | Bradford | |
| 6,990,458 B2* | 1/2006 | Harrison et al. | 705/7.14 |
| 7,065,456 B1 | 6/2006 | Butka et al. | |
| 7,085,280 B2 | 8/2006 | Martin | |
| 7,127,412 B2* | 10/2006 | Powell et al. | 705/7.16 |
| 7,171,375 B2* | 1/2007 | Clarke | 705/7.14 |
| 7,222,082 B1 | 5/2007 | Adhikari et al. | |
| 7,283,971 B1 | 10/2007 | Levine et al. | |
| 7,634,431 B2 | 12/2009 | Stratton | |
| 7,640,196 B2 | 12/2009 | Weiss | |
| 7,725,857 B2 | 5/2010 | Foltz et al. | |
| 7,729,939 B2* | 6/2010 | Richardson et al. | 705/7.23 |
| 2001/0032103 A1* | 10/2001 | Sinex | 705/4 |
| 2001/0037229 A1 | 11/2001 | Jacobs et al. | |
| 2001/0049619 A1 | 12/2001 | Powell et al. | |
| 2002/0015064 A1 | 2/2002 | Robotham et al. | |
| 2002/0029161 A1 | 3/2002 | Brodersen et al. | |
| 2002/0040313 A1 | 4/2002 | Hunter et al. | |
| 2002/0065700 A1* | 5/2002 | Powell et al. | 705/9 |
| 2002/0069018 A1 | 6/2002 | Brueckner et al. | |
| 2002/0069235 A1 | 6/2002 | Chen | |
| 2002/0076031 A1 | 6/2002 | Falcon et al. | |
| 2002/0125998 A1* | 9/2002 | Petite et al. | 340/286.01 |
| 2002/0143469 A1 | 10/2002 | Alexander et al. | |
| 2002/0152290 A1 | 10/2002 | Ritche | |
| 2003/0061068 A1 | 3/2003 | Curtis | |
| 2003/0069797 A1 | 4/2003 | Harrison | |
| 2003/0088492 A1 | 5/2003 | Damschroder | |
| 2003/0120538 A1 | 6/2003 | Boerke et al. | |
| 2003/0139955 A1* | 7/2003 | Kirii et al. | 705/7 |
| 2003/0149598 A1 | 8/2003 | Santoso et al. | |
| 2003/0152045 A1* | 8/2003 | Martin, IV | 370/328 |
| 2003/0167238 A1* | 9/2003 | Zeif | 705/400 |
| 2003/0182052 A1 | 9/2003 | Delorme et al. | |
| 2003/0187710 A1 | 10/2003 | Baumer et al. | |
| 2003/0216957 A1 | 11/2003 | Florence et al. | |
| 2003/0233278 A1 | 12/2003 | Marshall | |
| 2004/0019542 A1* | 1/2004 | Fuchs et al. | 705/32 |
| 2004/0064436 A1 | 4/2004 | Breslin et al. | |
| 2004/0111311 A1 | 6/2004 | Ingman et al. | 705/9 |
| 2004/0111312 A1 | 6/2004 | Ingman et al. | 705/9 |
| 2004/0111313 A1 | 6/2004 | Ingman et al. | 705/9 |
| 2004/0111634 A1 | 6/2004 | Ingman et al. | 713/201 |
| 2004/0204969 A1* | 10/2004 | Wu | 705/6 |
| 2004/0249743 A1* | 12/2004 | Virginas et al. | 705/37 |
| 2005/0015504 A1 | 1/2005 | Dorne et al. | |
| 2005/0043986 A1* | 2/2005 | McConnell et al. | 705/11 |
| 2005/0119930 A1* | 6/2005 | Simon | 705/9 |
| 2005/0131943 A1* | 6/2005 | Lewis et al. | 707/104.1 |
| 2005/0144058 A1* | 6/2005 | Luo | 705/8 |
| 2005/0171877 A1 | 8/2005 | Weiss | |
| 2005/0228725 A1 | 10/2005 | Rao et al. | |
| 2006/0015393 A1 | 1/2006 | Eisma et al. | |
| 2006/0031110 A1 | 2/2006 | Benbassat et al. | |
| 2006/0050854 A1 | 3/2006 | Beamon | |
| 2006/0053035 A1* | 3/2006 | Eisenberg | 705/2 |
| 2006/0064305 A1* | 3/2006 | Alonso | 705/1 |
| 2006/0064338 A1 | 3/2006 | Brotman et al. | |
| 2006/0090160 A1 | 4/2006 | Forsythe et al. | |
| 2006/0111957 A1* | 5/2006 | Carmi et al. | 705/9 |
| 2006/0150077 A1 | 7/2006 | Sheldon et al. | |
| 2006/0182527 A1 | 8/2006 | Ranstrom et al. | |
| 2006/0213817 A1 | 9/2006 | Scott et al. | |
| 2006/0235739 A1* | 10/2006 | Levis et al. | 705/9 |
| 2007/0078988 A1 | 4/2007 | Miloushev et al. | |
| 2007/0087756 A1 | 4/2007 | Hoffberg | |
| 2007/0174101 A1 | 7/2007 | Li et al. | |
| 2007/0179830 A1 | 8/2007 | Iknoian | |
| 2007/0211881 A1 | 9/2007 | Parker-Stephen | |
| 2007/0219842 A1 | 9/2007 | Bansal et al. | |
| 2007/0226090 A1 | 9/2007 | Stratton | |
| 2007/0282654 A1* | 12/2007 | Sarkar | 705/8 |
| 2008/0016436 A1 | 1/2008 | Liu et al. | |
| 2008/0046803 A1 | 2/2008 | Beauchamp et al. | |
| 2008/0065456 A1* | 3/2008 | Labedz et al. | 705/8 |
| 2008/0140597 A1 | 6/2008 | Satir et al. | |
| 2008/0162242 A1 | 7/2008 | Schneur et al. | |
| 2008/0172242 A1 | 7/2008 | Hyatt | |
| 2008/0263491 A1 | 10/2008 | Foltz et al. | |
| 2009/0020297 A1 | 1/2009 | Ingman et al. | |
| 2009/0024431 A1 | 1/2009 | Ingman et al. | |
| 2009/0024435 A1 | 1/2009 | Ingman et al. | |
| 2009/0024436 A1 | 1/2009 | Ingman et al. | |
| 2009/0024437 A1 | 1/2009 | Ingman et al. | |
| 2009/0024438 A1 | 1/2009 | Ingman et al. | |
| 2009/0024646 A1 | 1/2009 | Ingman et al. | |
| 2009/0024957 A1 | 1/2009 | Ingman et al. | |
| 2009/0024999 A1 | 1/2009 | Ingman et al. | |

OTHER PUBLICATIONS

Lesaint et al., "Engineering Dynamic Scheduler for Work Manager", Jul. 1998, BT Technol J, 16(3):16-29.
U.S. Official Action dated Feb. 10, 2 010 in U.S. Appl. No. 11/778,867.
U.S. Official Action dated Apr. 15, 2010 in U.S. Appl. No. 11/778,962.
U.S. Official Action dated Apr. 1, 2010 in U.S. Appl. No. 11/778,999.
U.S. Official Action dated Feb. 2, 2010 in U.S. Appl. No. 11/778,867.
U.S. Official Action dated Dec. 9, 2010 in U.S. Appl. No. 11/778,919.
U.S. Official Action dated Nov. 24, 2010 in U.S. Appl. No. 11/779,011.
Xu et al., "Effective Heuristic Procedures for a Field Technician Scheduling Problem" (2001) Kluwer Academic Publishers, p. 495-509.
U.S. Official Action dated Jan. 25, 2011 in U.S. Appl. No. 11/778,962.
U.S. Official Action dated Mar. 24, 2011 in U.S. Appl. No. 11/778,953.
U.S. Official Action dated Feb. 4, 2011 in U.S. Appl. No. 11/779,027.
U.S. Official Action dated Feb. 1, 2011 in U.S. Appl. No. 11/779,073.
U.S. Notice of Allowance dated Mar. 24, 2011 in U.S. Appl. No. 11/779,087.
U.S. Official Action dated Aug. 23, 2010 in U.S. Appl. No. 11/778,919.
U.S. Official Action dated Aug. 26, 2010 in U.S. Appl. No. 11/778,962.
U.S. Official Action dated Sep. 24, 2010, 2010 in U.S. Appl. No. 11/778,999.
U.S. Official Action dated Oct. 13, 2010 in U.S. Appl. No. 11/778,953.
U.S. Official Action dated Oct. 27, 2010 in U.S. Appl. No. 11/779,087.
U.S. Notice of Allowance dated May 3, 2011 in U.S. Appl. No. 11/778,999.
U.S. Official Action dated May 11, 2011 in U.S. Appl. No. 11/779,011.
U.S. Notice of Allowance dated Aug. 4, 2011 in U.S. Appl. No. 11/779,027.
U.S. Office Action dated Aug. 25, 2011 in U.S. Appl. No. 11/778,919.

* cited by examiner

METHODS, SYSTEMS, AND COMPUTER-READABLE MEDIA FOR PROVIDING AN INDICATION OF HIGHTIME

CROSS-REFERENCE TO RELATED APPLICATIONS

The present application is related to commonly assigned U.S. patent application Ser. No. 11/778,953, filed concurrently herewith, titled "METHODS, SYSTEMS, AND COMPUTER-READABLE MEDIA FOR DETERMINING A PLURALITY OF TURFS FROM WHERE TO REALLOCATE A WORKFORCE TO A GIVEN TURF;" commonly assigned U.S. patent application Ser. No. 11/778,999, filed concurrently herewith, titled "METHODS, SYSTEMS, AND COMPUTER-READABLE MEDIA FOR GENERATING A REPORT INDICATING JOB AVAILABILITY," commonly assigned U.S. patent application Ser. No. 11/779,027, filed concurrently herewith, titled "METHODS, SYSTEMS, AND COMPUTER-READABLE MEDIA FOR PROVIDING AN INDICATION OF A SCHEDULE CONFLICT," commonly assigned U.S. patent application Ser. No. 11/779,087, filed concurrently herewith, titled "METHODS, SYSTEMS, AND COMPUTER-READABLE MEDIA FOR PROVIDING FUTURE JOB INFORMATION," commonly assigned U.S. patent application Ser. No. 11/778,867, filed concurrently herewith, titled "METHODS, SYSTEMS, AND COMPUTER-READABLE MEDIA FOR PROVIDING NOTIFICATION OF A LAST JOB DISPATCH," commonly assigned U.S. patent application Ser. No. 11/778,919, filed concurrently herewith, titled "METHODS, SYSTEMS, AND COMPUTER-READABLE MEDIA FOR PROVIDING COMMITMENTS INFORMATION RELATIVE TO A TURF," commonly assigned U.S. patent application Ser. No. 11/778,962, filed concurrently herewith, titled "METHODS, SYSTEMS, AND COMPUTER-READABLE MEDIA FOR PROVIDING CONTACT INFORMATION AT TURF LEVEL," commonly assigned U.S. patent application Ser. No. 11/779,011, filed concurrently herewith, titled "METHODS, SYSTEMS, AND COMPUTER-READABLE MEDIA FOR PROVIDING A RATIO OF TASKS PER TECHNICIAN," and commonly assigned U.S. patent application Ser. No. 11/779,073, filed concurrently herewith, titled "METHODS, SYSTEMS, AND COMPUTER-READABLE MEDIA FOR PROVIDING WORKFORCE TO LOAD INFORMATION," each of which is hereby incorporated herein by reference.

TECHNICAL FIELD

This application relates generally to the field of load balancing. More specifically, the disclosure provided herein relates to the field of dynamic workforce reallocation.

BACKGROUND

Telecommunications networks may provide a number of services, such as plain old telephone service ("POTS"), digital subscriber line ("DSL"), and cable. A telecommunications network may be divided into a plurality of geographic areas known as turfs. Maintenance of the telecommunications network generally involves a proper reallocation of technicians across the turfs such that work orders can be timely filled. For example, when one turf experiences a high volume of work orders, it may be desirable to reallocate available technicians from another, preferably nearby, turf with a low volume of work orders to help with the high volume. The reallocation of technicians may be based on a number of factors, such as the location, skills, schedule, and availability of the technicians, as well as the priority of the work orders and the amount of time to complete the work orders.

Each technician generally works a given amount of time during a work shift. A common work shift is approximately eight hours. Each technician may be assigned a schedule of a plurality of jobs to complete during the work shift. To properly allocate jobs to each technician and to facilitate a proper management of each technician's workload, each job on the schedule may be given an estimated start time and an estimated duration for completion. When the time spent by a technician on a given job exceeds the estimated duration for the job, a number of problems may arise. For example, the technician may not make the estimated start time for a next job on the schedule or, in some cases, may even miss the appointment for the next job entirely.

A load balance supervisor ("LBS") may be assigned to coordinate the reallocation of technicians within a plurality of turfs. The LBS conventionally relies on retrieving the schedules of the technicians and manually manipulating data to determine whether a technician has exceeded the duration for completion of a given job. If the LBS manages a substantial number of technicians or is under a heavy load, the LBS may not determine that a technician has exceeded the duration for completion of a given job until it becomes too late to take any corrective action.

SUMMARY

Embodiments of the disclosure presented herein include methods, systems, and computer-readable media for providing an indication of hightime. According to one aspect, a method for providing an indication of hightime is provided. According to the method, whether at least one of a plurality of technicians exceeds an allotted time with which to complete a job is determined. In response to determining that at least one of the plurality of technicians exceeds the allotted time, an indication that at least one of the plurality of technicians exceeds the allotted time is provided.

According to another aspect, a system for providing an indication of hightime is provided. The system includes a memory and a processor functionally coupled to the memory. The memory stores a program containing code for providing an indication of hightime. The processor is responsive to computer-executable instructions contained in the program and operative to: determine whether at least one of a plurality of technicians exceeds an allotted time with which to complete a job, and in response to determining that at least one of the plurality of technicians exceeds the allotted time, provide an indication that at least one of the plurality of technicians exceeds the allotted time.

According to yet another aspect, a computer-readable medium having instructions stored thereon for execution by a processor to perform a method for providing an indication of hightime is provided. According to the method, whether at least one of a plurality of technicians exceeds an allotted time with which to complete a job is determined. In response to determining that at least one of the plurality of technicians exceeds the allotted time, an indication that at least one of the plurality of technicians exceeds the allotted time is provided.

Other systems, methods, and/or computer program products according to embodiments will be or become apparent to one with skill in the art upon review of the following drawings and detailed description. It is intended that all such additional systems, methods, and/or computer program products be

DETAILED DESCRIPTION

The following detailed description is directed to methods, systems, and computer-readable media for providing an indication of hightime. In the following detailed description, references are made to the accompanying drawings that form a part hereof, and which are shown by way of illustration specific embodiments or examples.

As used herein, the terms "work order," "job," and "task" are used interchangeably. Although not so limited, embodiments described herein primarily refer to a "work order" as the maintenance and repair of a telecommunications network by a technician. However, it will be apparent to one of ordinary skill in the art that, in further embodiments, a "work order" may include any suitable service that involves the allocation and reallocation of personnel to perform the service.

Embodiments described herein provide a Next Generation Load Balance ("NGLB") tool for work force reallocation. According to exemplary embodiments, the NGLB tool has a graphical user interface ("GUI"), such as a GUI 400 of FIG. 5, containing an organized overview of work order and technician statuses within a plurality of turfs. The NGLB tool may be utilized by a load balance supervisor ("LBS") or other load balancing personnel to aid in the coordination of work force reallocation within the plurality of turfs. In one embodiment, the NGLB tool is provided to the LBS as a web-based application that can be accessed remotely via, for example, a web browser. In addition, the NGLB tool may be stored on a computing device used by the LBS to balance personnel.

Figure 2:
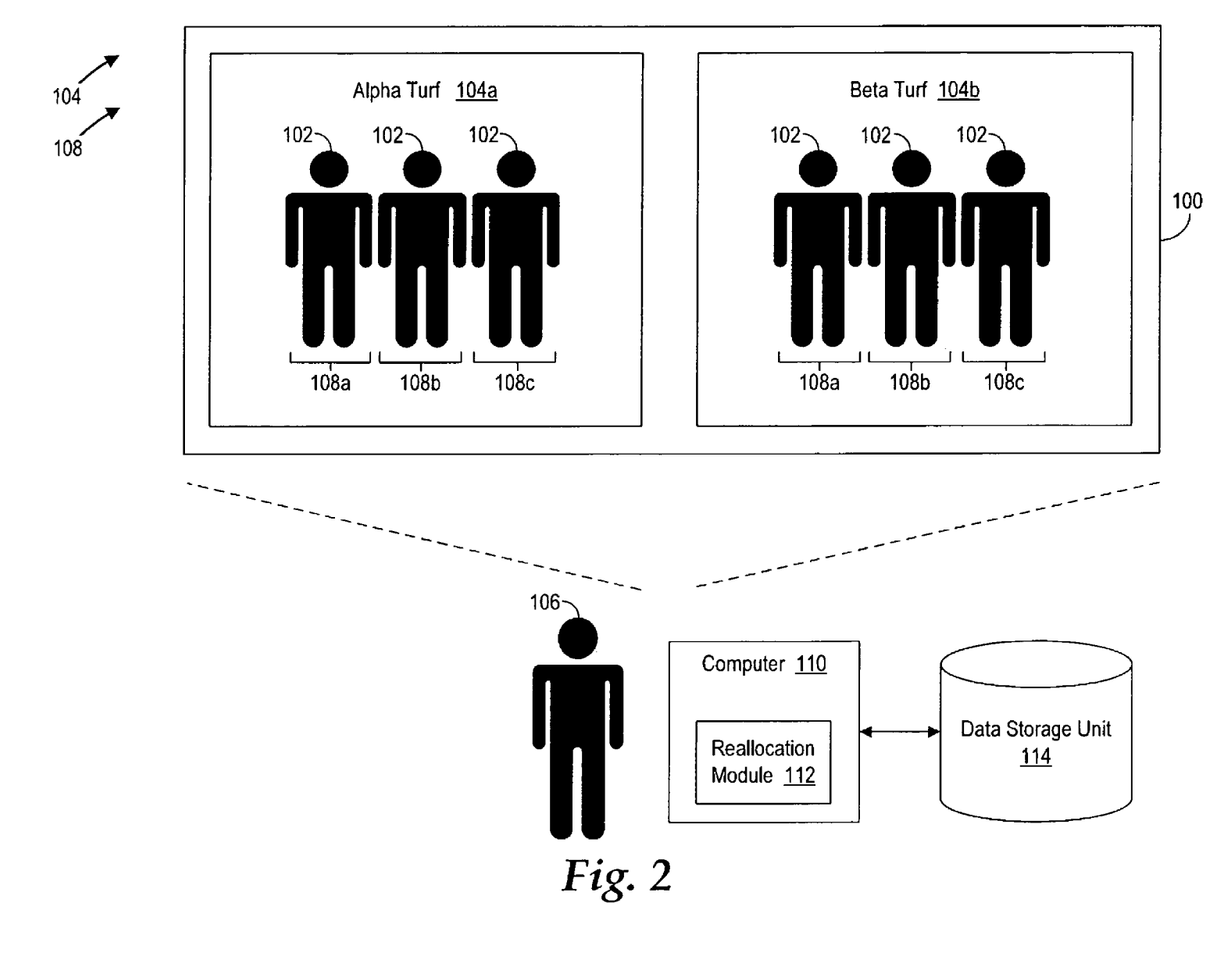
FIG. 2 is a high-level diagram illustrating an allocation of technicians for maintaining and repairing a telecommunications network, in accordance with exemplary embodiments.
Figure 3:
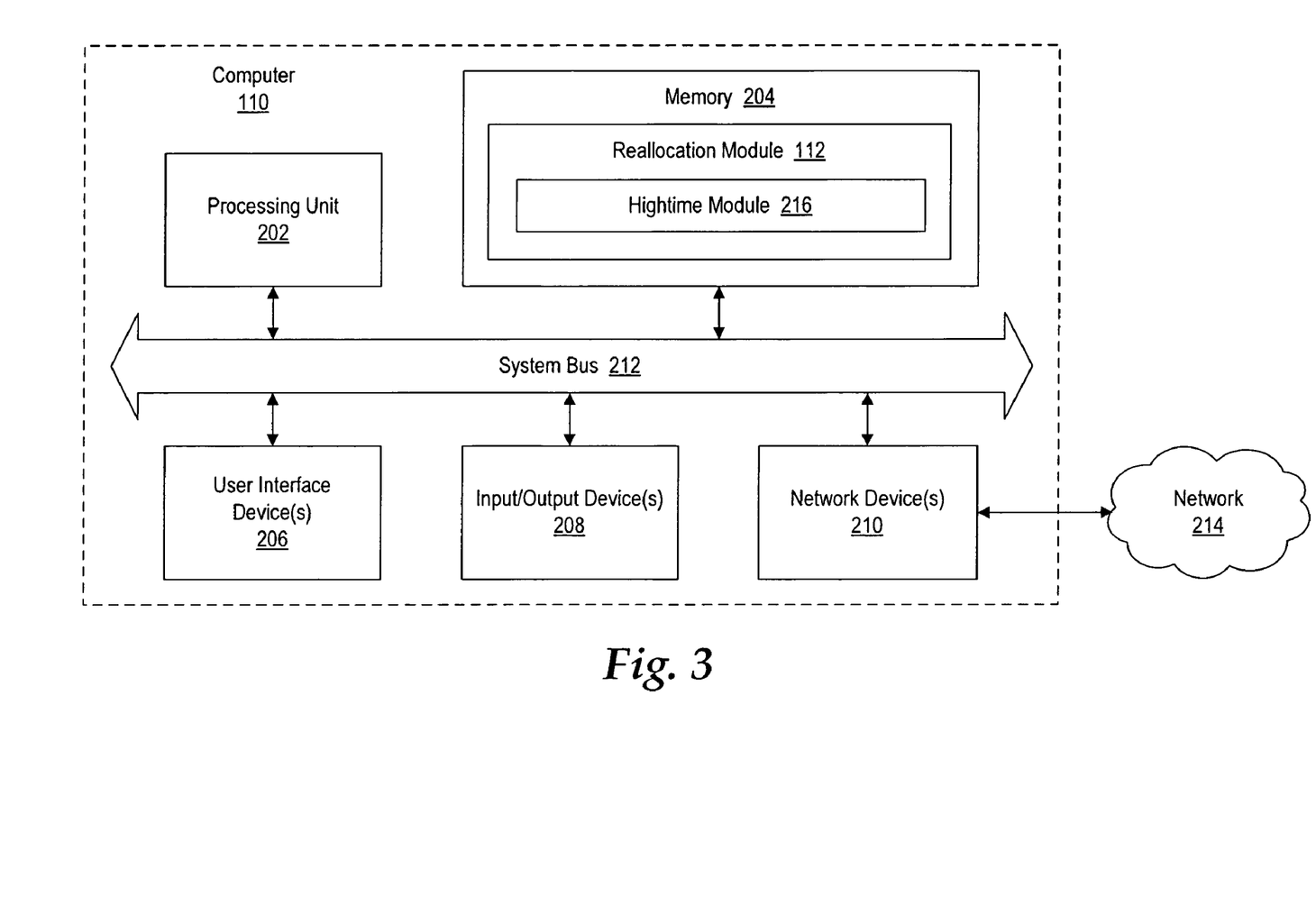
FIG. 3 is a block diagram illustrating a computer configured to provide a GUI that aids in the reallocation of the technicians across a plurality of turfs, in accordance with exemplary embodiments.
Figure 4:
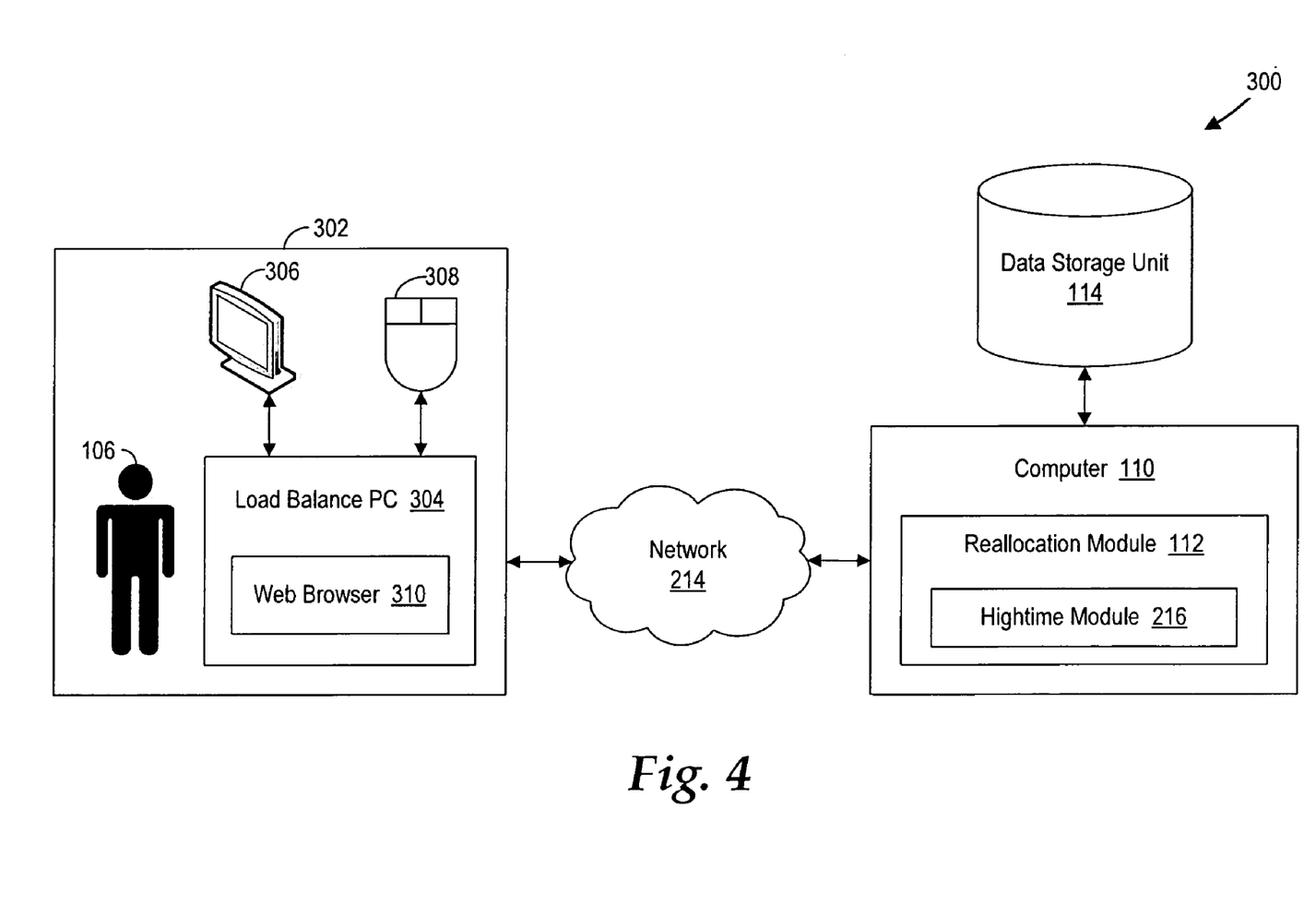
FIG. 4 is a block diagram of a workforce reallocation system, in accordance with exemplary embodiments.

According to further embodiments, the NGLB tool includes a hightime module, such as a hightime module 216 of FIGS. 3 and 4. The hightime module 216 provides information on technicians, such as the technicians 102 of FIG. 2, who exceed a threshold amount of time with which to complete a given job, according to one embodiment. As used herein, the term "hightime" refers to a time frame beginning when a technician exceeds the threshold amount of time with which to complete a given job and ending when the technician completes the job. In one embodiment, notification of hightime is provided during the entire time frame. The hightime module 216 may provide the hightime information via a GUI, such as the GUI 400 of FIG. 5. A LBS viewing the GUI 400 may utilize the hightime information to reassign jobs for technicians that are in hightime. For example, if the LBS believes that a technician will not be timely dispatched to a next job on the schedule due to hightime in a current job, the LBS may reassign the next job to another technician.

Figure 1:
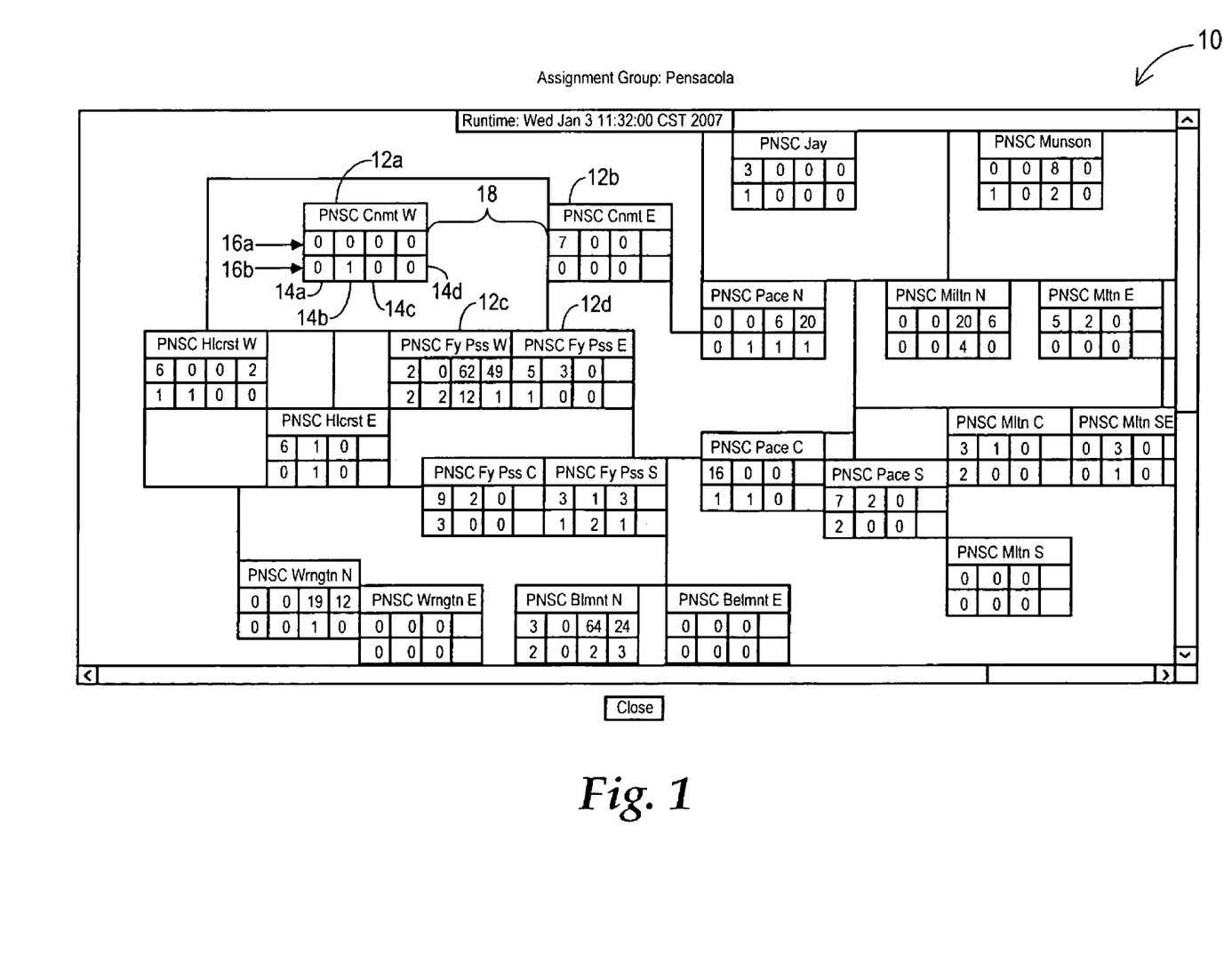
FIG. 1 is a diagram of an exemplary embodiment of a graphical user interface ("GUI") in a previous version.

Referring now to the drawings, it is to be understood that like numerals represent like elements through the several figures, and that not all components and/or steps described and illustrated with reference to the figures are required for all embodiments. FIG. 1 is an exemplary embodiment of the GUI 10 utilized in a previous version of the NGLB tool implemented by assignee of this application on or about April 2005. As illustrated in FIG. 1, the GUI 10 includes a plurality of turfs, such as turfs 12a, 12b, 12c, 12d. Each of the turfs, such as the turf 12a, includes four columns 14a, 14b, 14c, 14d. Each of the four columns 14a, 14b, 14c, 14d includes a first cell 16a and a second cell 16b. The first cell 16a includes job information and the second cell 16b includes technician information, according to one embodiment. The GUI 10 provides map presentation of the turfs 12a, 12b, 12c, 12d. The map presentation provides a visual mapping of physical distances between each of the plurality of the turfs 12a, 12b, 12c, 12d. In one example, the physical distance between the turf 12a and the turf 12b is a distance 18. In another example, the turf 12c and turf 12d are contiguous as indicated by the turf 12c being in contact with the turf 12d in the GUI 10.

FIGS. 2-6 as described below illustrate a current version of the NGLB tool. FIG. 2 is a high-level diagram illustrating an allocation of the technicians 102 for maintaining and repairing a telecommunications network 100, in accordance with exemplary embodiments. The telecommunications network 100 is maintained and repaired by a plurality of the technicians 102. As illustrated in FIG. 2, each of the technicians 102 is assigned to an Alpha turf 104a or a Beta turf 104b (collectively turfs 104) by a LBS 106 or other load balancing personnel, according to exemplary embodiments. Each turf 104 includes a plain old telephone service ("POTS") bucket 108a, a digital subscriber line ("DSL") bucket 108b, and a cable bucket 108c (collectively buckets 108), according to one embodiment. Each of the buckets 108 represents a discipline in which one or more of the technicians 102 may be assigned based on the skill set of the technician 102. In particular, the technician 102 in the POTS bucket 108a should have a skill set for completing POTS related work orders. The technician 102 in the DSL bucket 108b should have a skill set for completing DSL related work orders, and the technician 102 in the cable bucket 108c should have a skill set for completing cable related work orders. In one embodiment, one or more of the technicians 102 may include multiple skill sets for completing work orders under multiple buckets 108. The technicians 102 may be managed by one or more field supervisors (not shown). For example, the technicians 102 in each bucket 108 may be managed by a separate field supervisor.

For the sake of simplicity and without limitation, only two turfs 104a and 104b and three buckets 108a, 108b, and 108c are illustrated in FIG. 2. However, it will be apparent to those of ordinary skill in the art that the telecommunications network 100 may include any suitable number of turfs 104 and any suitable number and types of buckets 108, according to further embodiments.

The LBS 106 utilizes a computer 110 to aid in reallocating the plurality of technicians 102 across the turfs 104. The computer 110 includes a reallocation module 112, which enables the computer 110 to display a graphical user interface ("GUI"), such as the GUI 400 of FIG. 5, that provides the LBS 106 with an organized, visual presentation of the technicians 102, the turfs 104, and the buckets 108, according to one embodiment. In one example, if work orders in the Alpha turf 104a cannot be timely filled without additional technicians 102, the LBS 106 may view the GUI 400 to determine if the technicians 102 in the Beta turf 104b can be utilized. In a further example, if service orders in the POTS bucket 108a cannot be timely filled without additional technicians 102, the LBS 106 may view the GUI 400 to determine if the technicians 102 in the DSL bucket 108b or the cable bucket 108c are qualified to fill POTS work orders. In one embodiment, the computer 110 functions as a web server located remotely from the LBS 106 by executing a web server application, such as BEA WEBLOGIC SERVER from BEA SYSTEMS. In this embodiment, the LBS 106 may access the GUI 400 over a network, such as a network 214 of FIGS. 3 and 4, using, for example, a local web browser interface on a personal computer ("PC") or other computing device.

In one embodiment, each technician 102 carries a portable computing device (not shown), such as a laptop computer. The portable computing device enables the technician 102 to receive job information out in the field without having to return to a base station, thereby increasing efficiency. The job information may include, for example, the location of the job, the type of work to be done on the job, and the time at which the job is to be done. The technician 102 may access the job information using dispatch software executed on the portable computer device, as is known to those skilled in the art. The dispatch software may include a number of suitable functions for the technician 102 to transmit and receive information related to dispatches. In one embodiment, the dispatch software includes a Get Job function that enables the technician 102 to request a job.

Figure 5:
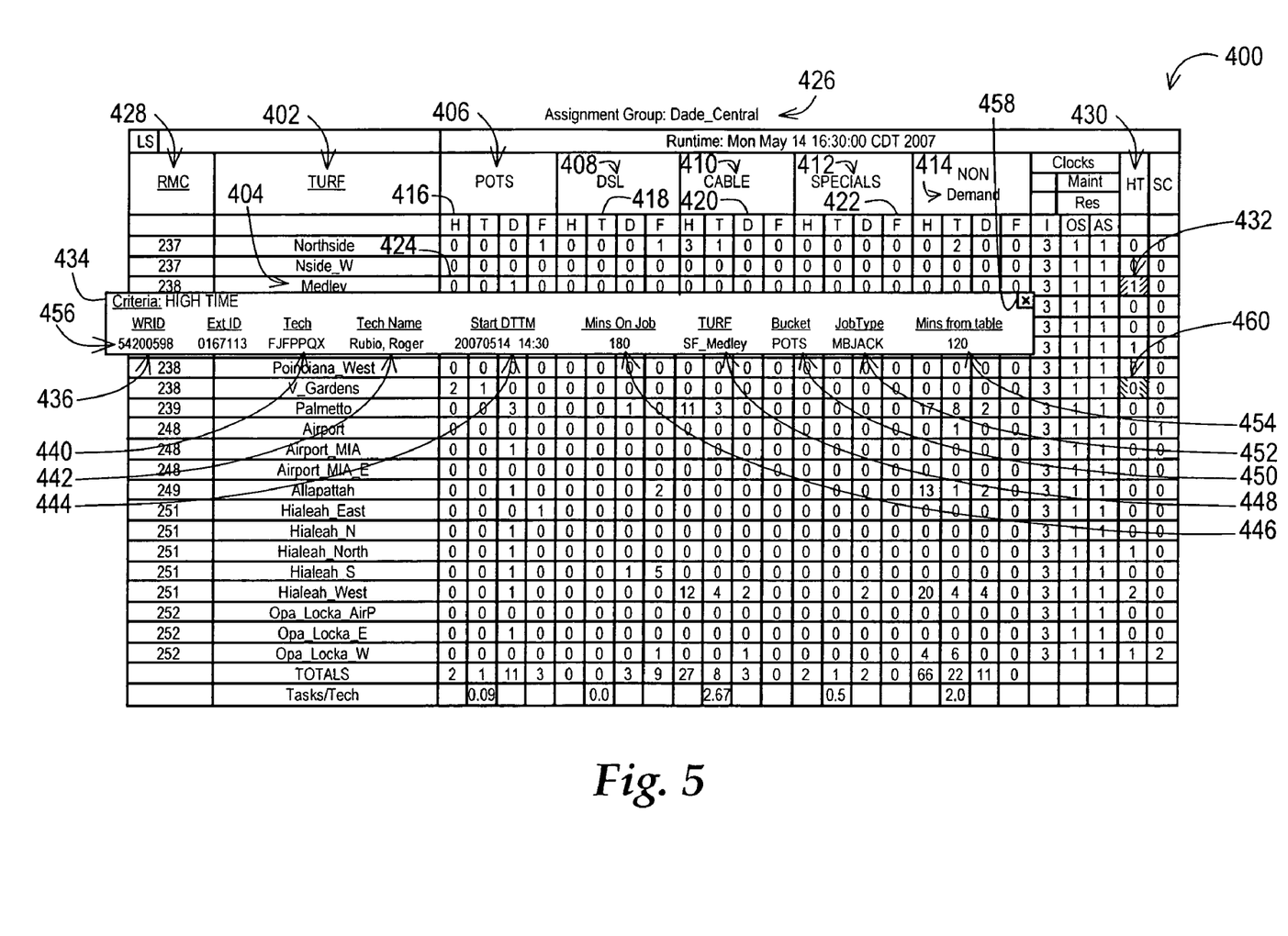
FIG. 5 is a diagram of a GUI, in accordance with exemplary embodiments.

In one embodiment, the reallocation module 112 generates at least a portion of the GUI 400 based on data stored in a data storage unit 114. The data storage unit 114 may store any suitable data related to the technicians 102, such as the location, skills, schedule, and availability of the technicians 102. The data storage unit 114 may be a database. In one embodiment, the data storage unit 114 is an Integrated Dispatch System ("IDS"). The IDS is described in greater detail in U.S. Patent Application Publication No. 2004/0111311, entitled "Turfs and Skills for Multiple Technicians," to Ingman et al.; U.S. Patent Application Publication No. 2004/0111312, entitled "Validating Turfs for Work Orders," to Ingman et al.; U.S. Patent Application Publication No. 2004/0111313, entitled "Methods and Systems for Assigning Multiple Tasks," to Ingman et al.; and U.S. Patent Application Publication No. 2004/0111634, entitled "Security Permissions for an Integrated Dispatch System," to Ingman et al.

FIG. 3 and the following discussion are intended to provide a brief, general description of the computer 110 in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating the computer 110 configured to provide a GUI, such as the GUI 400 of FIG. 5, that aids in the reallocation of the technicians 102 across the turfs 104, in accordance with exemplary embodiments. The computer 110 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. According to exemplary embodiments, the memory 204 includes the reallocation module 112. In one embodiment, the reallocation module 112 is embodied in computer-readable media containing instructions that, when executed by the processing unit 202, generates a GUI, such as the GUI 400 of FIG. 5, containing information related to the reallocation of the technicians 102 across a plurality of the turfs 104, as described in greater detail below. Exemplary information related to the reallocation across a plurality of the turfs 104 includes, but is not limited to, the physical proximity between the technicians 102, the availability of the technicians 102, the physical proximity between the turfs 104, the existing load on each of the turfs 104, and the anticipated load on each of the turfs 104. According to further embodiments, the reallocation module 112 may be embodied in hardware, software, firmware, or any combination thereof.

As illustrated in FIG. 3, the reallocation module 112 includes the hightime module 216. In one embodiment, the hightime module 216 is embodied in computer-readable media containing instructions that, when executed by the processing unit 202, provides an indication of hightime, as described in greater details below. According to further embodiments, the hightime module 216 may be embodied in hardware, software, firmware, or any combination thereof.

As used herein, the term "hightime" refers to a time frame beginning when a technician, such as the technician 102, exceeds a threshold time with which to complete a job and ending when the technician 102 completes the job. The hightime module 216 may provide any suitable hightime information, including, but not limited to, a name of the technician 102, a time at which the technician 102 was dispatched to a job, an amount of time the technician 102 has worked on the job, and an amount of time the technician 102 was scheduled to complete the job (i.e., the threshold time). In one embodiment, the hightime module 216 provides the hightime information via a GUI, such as the GUI 400 of FIG. 5. A LBS 106 viewing the GUI 400, may utilize the hightime information to reassign a next job in the schedule of the technician 102 to another technician if, for example, the LBS 106 believes the technician 102 will not be timely dispatched to the next job due to hightime in a current job. In one embodiment, the technician 102 is considered to be dispatched when the technician 102 utilizes a Get Job function on a portable computing device. The technician 102 may be considered to have completed a current job when the technician 102 has been dispatched to a next job on the schedule.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 110.

The user interface devices 206 may include one or more devices with which a user accesses the computer 1 10. The user interface devices 206 may include, but are not limited to, computers, servers, personal digital assistants, cellular phones, or any suitable computing devices. In one embodiment, the computer 110 functions as a web server located remotely from the LBS 106 by executing a web server application, such as BEA WEBLOGIC SERVER from BEA SYSTEMS. By enabling the computer 110 to function as a web server, the LBS 106 may access the GUI 400 generated by the computer 110 over a network, such as the network 214, using, for example, a local web browser interface on a PC or other computing device.

According to exemplary embodiments, the I/O devices 208 enable a user to interface with the reallocation module 112. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, and an electronic stylus. Further, the I/O devices 208 may include one or more output devices, such as, but not limited to, a display screen and a printer.

The network devices 210 enable the computer 110 to communicate with other networks or remote systems via the network 214. Examples of the network devices 210 may include, but are not limited to, a modem, a radio frequency ("RF") or infrared ("IR") transceiver, a telephonic interface, a bridge, a router, or a network card. The network 214 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 214 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

FIG. 4 is a block diagram of a workforce reallocation system 300, in accordance with exemplary embodiments. The workforce reallocation system 300 includes the computer 110, a network dispatch center ("NDC") 302, and the data storage unit 114, each of which is operatively connected to the network 214. The NDC 302 includes a load balance PC 304, which is utilized by the LBS 106, according to one embodiment. In further embodiments, the NDC 302 may include any suitable number of load balance PCs 304 to be utilized by any suitable number of LBSs 106. The data storage unit 114 may store any suitable data regarding the technicians 102, such as their location, skills, schedule, and availability. In one embodiment, the reallocation module 112 retrieves data from the data storage unit 114 to generate a GUI, such as the GUI 400 of FIG. 5. The data storage unit 114 may be a database. In one embodiment, the data storage unit 114 is an IDS.

The load balance PC 304 includes a display 306 and a mouse 308, according to one embodiment. In further embodiments, the load balance PC 304 may include any suitable input/output devices 208. It will be apparent to one having ordinary skill in the art that the load balance PC 304 may be substituted with any suitable computing device, such as a personal digital assistant or a cellular phone. The display 306 may be configured to display the GUI 400 and the hightime information provided by the hightime module 216.

In exemplary embodiments, the load balance PC 304 includes a web browser 310, such as INTERNET EXPLORER from MICROSOFT CORPORATION, for accessing the GUI 400 and for facilitating communications between the LBS 106 and the computer 110. Using the web browser 310, the LBS 106 may access the GUI 400 by inputting a Uniform Resource Locator ("URL") into the web browser 310. The load balance PC 304 may communicate with the computer 110 via Hypertext Transfer Protocol ("HTTP"). As previously described, the computer 110 may function as a web server. In one embodiment, access to the GUI 400 by the load balance PC 304 may be restricted by a login screen requiring, for example, a login identification and a password. In further embodiments, communications between the load balance PC 304 and the computer 110 may be encrypted by any suitable encryption mechanism.

In exemplary embodiments, the computer 110 may communicate with the data storage unit 114 via a Java Database Connectivity ("JDBC") application program interface ("API"). In one embodiment, the computer 110 retrieves data from the data storage unit 114 at regular intervals, such as every two to five minutes. In further embodiments, the computer 110 retrieves data from the data storage unit 114 when requested by the LBS 106. In other embodiments, the reallocation module 112 may be stored on the load balance PC 304 such that the GUI 400 is accessed from the load balance PC 304 and such that the load balance PC 304 communicates with and retrieves data from the data storage unit 114.

FIG. 5 is an exemplary embodiment of the GUI 400. In one embodiment, the GUI 400 is generated by the reallocation module 112 of the computer 110. The LBS 106 may view the GUI 400 on the display 306 via the web browser 310 in the load balance PC 304. In one embodiment, various portions of the GUI 400 are accessible by an input device, such as the mouse 308. It should be appreciated that the GUI 400 illustrated in FIG. 5 is only an exemplary embodiment. It will be apparent to one having ordinary skill in the art that in other embodiments, the GUI 400 may be displayed differently (e.g., as a map presentation), may omit certain fields, or may include other fields.

According to exemplary embodiments, the GUI 400 includes a plurality of turfs 402, such as a Medley turf 404. The GUI 400 may further include a plurality of buckets: a POTS bucket 406, a DSL bucket 408, a Cable bucket 410, a Specials bucket 412, and a Non-Demand ("ND") bucket 414. According to exemplary embodiments, each of the buckets 406-414 includes four columns: an Hours column 416, a Tickets column 418, a Dispatched Technicians (hereinafter referred to as Dispatches) column 420, and a Future Tickets (hereinafter referred to as Futures) column 422. Each of a plurality of cells 424, 432, and 460 may be associated with a column, a bucket, and a turf. For example, the cell 424 is associated with the Hours column 416, the POTS bucket 406, and the Medley turf 404.

Each of the plurality of turfs 402, such as the Medley turf 404, may refer to any suitable geographic area. For example, the Medley turf 404 refers to the city of Medley, Fla. As illustrated in FIG. 5, the GUI 400 displays the turfs 402, including the Medley turf 404, contained in the central Dade assignment group ("AG") 426. In one embodiment, the NDC 302 includes a plurality load balance PCs, such as the PC 304, where each load balance PC corresponds to a different AG, such as the AG 426.

According to exemplary embodiments, the POTS bucket 406 contains information related to POTS related work orders. The DSL bucket 408 contains information related to DSL related work orders. The Cable bucket 410 contains information related to cable related work orders. The Specials bucket 412 contains information related to special circuit related work orders, such as Digital Signal 1 ("DS1") and Digital Signal 3 ("DS3"). The ND bucket 414 is a catch-all bucket containing information related to work orders not categorized in the POTS bucket 406, the DSL bucket 408, the Cable bucket 410, or the specials bucket 412.

The Hours column 416 indicates the number of hours of pending and assigned work orders in each of the plurality of turfs 402. As used herein, an assigned work order is defined as a work order that is assigned to a technician, such as the technician 102, and a pending work order is defined as a work order that is not assigned to a technician 102 and is to be completed within the current business day. The tickets column 418 indicates the number of tickets (i.e., work orders) corresponding to the number of hours shown in the Hours column 416 of one of the buckets 406, 408, 410, 412, 414. The Dispatches column 420 indicates the number of technicians 102 dispatched. The Futures column 422 indicates the number of future jobs to be completed by the technicians 102.

The GUI 400 may further include a Regional Maintenance Center ("RMC") column 428, which indicates the RMC number designated to a particular turf. In one embodiment, each RMC number listed under the RMC column 428 may be accessible by an input device, such as the mouse 308. For example, a RMC number may be accessed by hovering a mouse cursor over the RMC number or by clicking the RMC number using the mouse 308. In response to accessing the RMC number, the GUI 400 may display a window, such as a drop-down window, according to one embodiment. The window may include information related to each of the buckets 406-414, such as hours, tickets, and dispatches.

As illustrated in FIG. 5, the GUI 400 may include a hightime column 430, according to one embodiment. The hightime column 430 includes a plurality of cells, such as the cell 432, providing an indication of a number of technicians 102 that are in hightime for a particular turf 402. For example, the cell 432 indicates that one technician 102 is in hightime for the Medley turf 404. As previously noted, the term "hightime" refers to a time frame beginning when the technician 102 exceeds the threshold amount of time with which to complete a given job and ending when the technician 102 completes the job. In one embodiment, notification of hightime is provided during the entire time frame. The LBS 106 viewing the GUI 400 may utilize the indication to reassign jobs for the technicians 102 that are in hightime. For example, the LBS 106 may reassign a next job of the technician 102 if the LBS 106 believes the technician 102 will not be timely dispatched to the next job due to hightime in a current job.

In one embodiment, each cell, such as the cell 432, in the hightime column 430 is highlighted to easily distinguish between the turfs 402 that have at least one technician 102 in hightime. For example, the cell 432, which indicates that one technician 102 is in hightime, may be shaded red, while the cell 460, which indicates that no technicians 102 are in hightime, may be shaded green. The cells, such as the cell 432, in the hightime column 430 may be highlighted using any suitable visual cue, according to further embodiments.

In one embodiment, each cell, such as the cell 432, in the hightime column 430 may be accessed by an input device, such as the mouse 308. For example, the hightime column 430 may be accessed by hovering a mouse cursor over the cell or by clicking the cell using the mouse 308. In response to accessing a cell in the hightime column 430, the GUI 400 may display a window, such as a drop-down window 434, according to exemplary embodiments. The drop-down window 434 is displayed in response to accessing the cell 432. The drop-down window 434 provides hightime information for the Medley turf 404, which corresponds to the cell 432. In one embodiment, the drop-down window 434 includes a terminate button 458 with which to close the drop-down window 434.

The drop-down window 434 may include a job identification ("ID") column 436, a technician ID column 440, a technician name column 442, a time dispatched column 444, a time on the job column 446, a turf column 448, a bucket column 450, a job type column 452, and a time for completion column 454. The drop-down window 434 includes one row 456, which corresponds to one technician 102. The job ID column 436 specifies a particular job. The technician ID column 440 and the technician name column 442 identify a particular technician 102. The turf column 448 specifies the turf 402 for which the drop-down window 434 provides hightime information. The bucket column 450 specifies a bucket 406-414 in which the technician 102 identified by the technician ID column 440 and the technician name column 442 is assigned. The job type column 452 identifies the type of work to be done on the job identified by the job ID column 436.

According to exemplary embodiments, the time dispatched column 444 specifies the time at which the technician 102 identified by the technician ID column 440 and the technician name column 442 is dispatched to the job identified by the job ID column 436. At the row 456, the time dispatched column 444 specifies 2:30 pm. The time on the job column 446 specifies the total amount of time the technician 102 identified by the technician ID column 440 and the technician name column 442 has spent on the job identified by the job ID column 436. At the row 456, the time on the job column 446 specifies 180 minutes. In one embodiment, the time indicated in the time on the job column 446 is the difference between a current time and the dispatch time indicated time dispatched column 444. The time for completion column 454 specifies an estimated amount of time in which the job identified by the job ID column 436 is expected to be completed. At the row 456, the time for completion column 454 specifies 120 minutes. If the time on the job column 446 is greater than the time for completion column 454, the technician 102 identified by the technician ID column 440 and the technician name column 442 is determined to be in hightime, according to one embodiment. For example, referring to the row 456, the technician "Roger Rubio" (according to the technician name column 442) is in hightime because the amount of time that Roger Rubio has spent on the job (i.e., 180 minutes) is greater than the amount of time that for which he is expected to complete the job (i.e., 120 minutes).

Figure 6:
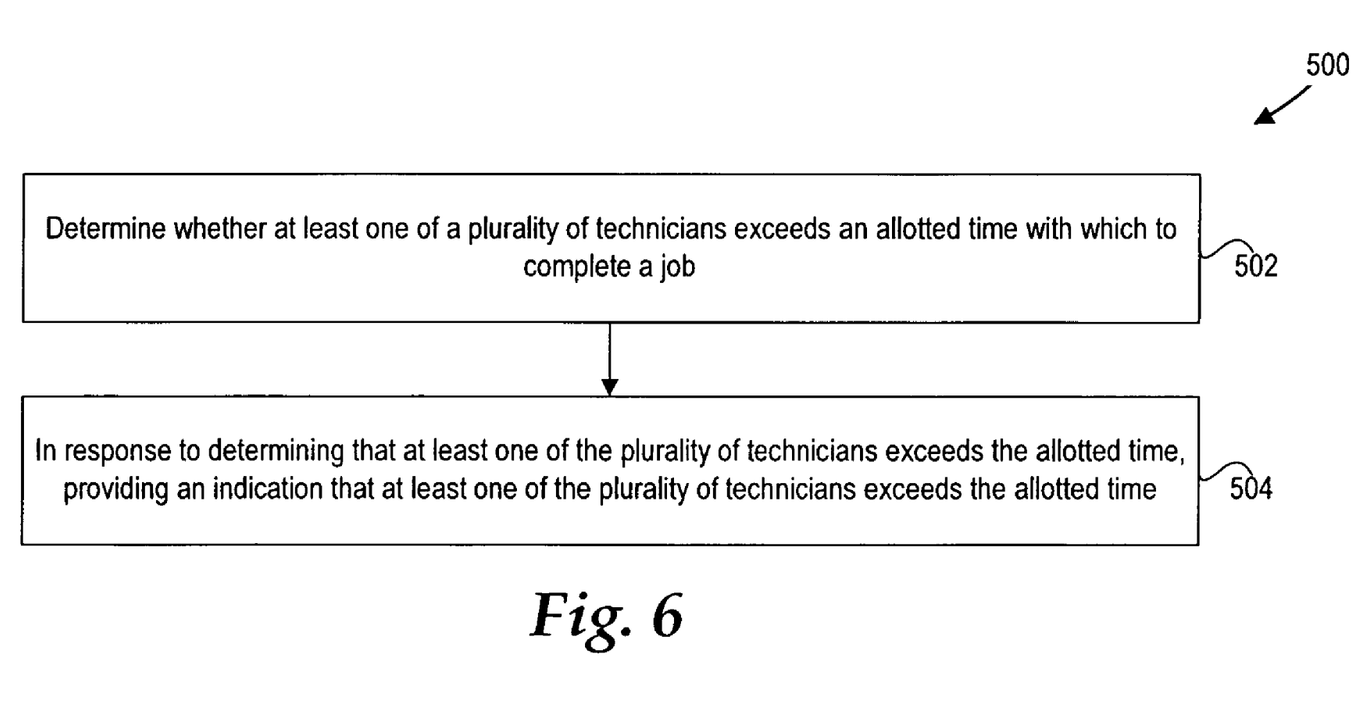
FIG. 6 is a flow diagram illustrating a method for providing an indication of hightime, in accordance with exemplary embodiments.

FIG. 6 is a flow diagram illustrating a method 500 for providing an indication of hightime, in accordance with exemplary embodiments. According to the method, the hightime module 216 determines (at 502) whether at least one of a plurality of technicians 102 exceeds an allotted amount of time with which to complete a job. The allotted time may be an estimated amount of time in which the job identified by the job ID column 436 is expected to be completed. Further, the allotted time may be dependent on the type of job to be completed. In one embodiment, whether at least one of the plurality of technicians 102 exceeds the allotted amount of time is determined by determining a difference between a current time and the dispatch time indicated under the time dispatched column 444. The difference may be compared with the allotted amount of time. In one embodiment, if the difference is less than or equal to the allotted amount of time for all of the plurality of technicians 102, then none of the plurality of technicians 102 exceed the allotted amount of time, according to one embodiment. If the difference is greater than the allotted amount of time for at least one of the plurality of technicians 102, then at least one of the plurality of technicians 102 exceeds the allotted amount of time.

In response to determining that at least one of the plurality of technicians 102 exceeds the allotted amount of time, the hightime module 216 provides an indication that at least one of the plurality of technicians exceeds the allotted time, according to exemplary embodiments. In one embodiment, a numeric indication is provided showing the aggregate number of technicians 102 that exceed the allotted amount of time. The numeric indication may be highlighted to distinguish between turfs 402 that have no technicians 102 that exceed the allotted amount of time and turfs 402 that have at least one technician 102 that exceeds the allotted amount of time. For example, the cell 432, which indicates that one of the plurality of technicians 102 exceeds the allotted amount of time, may be shaded red, while the cell 460, which indicates that no technicians 102 exceed the allotted amount of time, may be shaded green. In one embodiment, the indication is provided in GUI, such as the GUI 400.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A computer-implemented method for providing an indication of hightime, the method comprising computer-implemented operations for:

displaying, by a computer having a processors and a memory, a graphical user interface comprising a grid having a first row, a second row, and a hightime column, the first row corresponding to a first turf, the second row corresponding to a second turf, the graphical user interface comprising a first cell and a second cell under the hightime column, the first cell corresponding to the first row and the first turf, the second cell corresponding to the second row and the second turf;

determining, by the computer, whether at least one of a plurality of technicians exceeds an allotted time with which to complete a job;

in response to determining that at least one of the plurality of technicians exceeds the allotted time, incrementing, by the computer, (a) a first numeric value when the at least one of the plurality of technicians that exceeds the allotted time is assigned to the first turf and (b) a second numeric value when the at least one of the plurality of technicians that exceeds the allowed time is assigned to the second turf;

displaying, by the computer, the first numeric value within the first cell of the graphical user interface; and displaying, by the computer, the second numeric value within the second cell of the graphical user interface, wherein the first cell displays a first highlight when the first numeric indicator indicates that none of the plurality of technicians assigned to the first turf exceeds the allotted time;

wherein the first cell displays a second highlight when the first numeric indicator indicates that at least one of the plurality of technicians assigned to the first turf exceeds the allotted time:

wherein the second cell displays the first highlight when the second numeric indicator indicates that none of the plurality of technicians assigned to the second turf exceeds the allotted time; and wherein the second cell displays the second highlight when the second numeric indicator indicates that at least one of the plurality of technicians assigned to the second turf exceeds the allotted time.

2. The computer-implemented method of claim 1, determining whether at least one of a plurality of technicians exceeds an allotted time with which to complete a job comprises:

for at least one of plurality of technicians, determining, by the computer, a difference between a current time and a time dispatched to the job;

determining, by the computer, whether the difference is greater than the allotted time; and determining, by the computer, that at least one of the plurality of technicians exceeds the allotted time if the difference between the current time and the time dispatched to the job is greater than the allotted time.

3. The computer-implemented method of claim 1, wherein the allotted time is dependent on a type of job that is completed.

4. The computer-implemented method of claim 1, wherein the first numeric indicator comprises a first aggregate number of the plurality of technicians assigned to the first turf that exceed the allotted time; and wherein the second numeric indicator comprises a second aggregate number of the plurality of technicians assigned to the second turf that exceed the allotted time.

5. The computer-implemented method of claim 1, the method further comprising computer-implemented operations for;

receiving, via an input device coupled to the computer, a first user selection of the first cell;

in response to receiving the first user selection of the first cell, displaying, by the computer, a first window within the graphical user interface, the first window displaying a name, a time of dispatch, an amount of time on the job, and the allotted time for each of the at least one of the plurality of technicians assigned to the first turf that exceeds the allotted time;

receiving, via the input device, a second user selection of the second cell; and in response to receiving the second user selection of the second cell, displaying, by the computer, a second window within the graphical user interface, the second window displaying the name, the time of dispatch, the amount of time the allotted time for each of the at least one of the plurality of technicians assigned to the second turf that exceeds the allotted time.

6. A system for providing an indication of hightime, comprising a memory for storing a program containing code for providing an indication of hightime;

a processor functionally coupled to the memory, the processor being responsive to computer-executable instructions contained in the program and operative to:

display a graphical user interface comprising a grid having a first row, a second row, and a hightime column, the first row corresponding to a first turf, the second row corresponding to a second turf, the graphical user interface comprising a first cell and a second cell under the hightime column, the first cell corresponding to the first row and the first turf, the second cell corresponding to the second row and the second turf, determine whether at least one of a plurality of technicians exceeds an allotted time with which to complete a job, in response to determining that at least one of the plurality of technicians exceeds the allotted time, (a) a first numeric value when the at least one of the plurality of technicians that exceeds the allotted time is assigned to the first turf and (b) a second numeric value when the at least one of the plurality of technicians that exceeds the allowed time is assigned to the second turf;

display the first numeric value within the first cell of the graphical user interface, and display the second numeric value within the second cell of the graphical user interface, wherein the first cell displays a first highlight when the first numeric indicator indicates that none of the plurality of technicians assigned to the first turf exceeds the allotted time;

wherein the first cell displays a second highlight when the first numeric indicator indicates that at least one of the plurality of technicians assigned to the first turf exceeds the allotted time:

wherein the second cell displays the first highlight when the second numeric indicator indicates that none of the plurality of technicians assigned to the second turf exceeds the allotted time; and wherein the second cell displays the second highlight when the second numeric indicator indicates that at least one of the plurality of technicians assigned to the second turf exceeds the allotted time.

7. The system of claim 6, wherein to determine whether at least one of a plurality of technicians exceeds an allotted time with which to complete a job, the processor is further operative to:

for at least one of plurality of technicians, determining a difference between a current time and a time dispatched to the job;

determining whether the difference is greater than the allotted time; and determining that at least one of the plurality of technicians exceeds the allotted time if the difference between the current time and the time dispatched to the job is greater than the allotted time.

8. The system of claim 6, wherein the first numeric indicator comprises a first aggregate number of the plurality of technicians assigned to the first turf that exceed the allotted time; and wherein the second numeric indicator comprises a second aggregate number of the plurality of technicians assigned to the second turf that exceed the allotted time.

9. The system of claim 6, wherein the processor is further operative to:

receiving, via an input device coupled to the computer, a first user selection of the first cell, in response to receiving the first user selection of the first cell, displaying a first window within the graphical user interface, the first window displaying a name, a time of dispatch, an amount of time on the job, and the allotted time for each of the at least one of the plurality of technicians assigned to the first turf that exceeds the allotted time, receiving, via the input device, a second user selection of the second cell, and in response to receiving the second user selection of the second cell, displaying a second window within the graphical user interface, the second window displaying the name, the time of dispatch, the amount of time on the job, and the allotted time for each of the at least one of the plurality of technicians assigned to the second turf that exceeds the allotted time.

10. A computer-readable medium having instructions stored thereon for execution by a processor to perform a method for providing an indication of hightime, the method comprising:

Displaying a graphical user interface comprising a grid having a first row, a second row, and a hightime column, the first row corresponding to a first turf, the second row corresponding to a second turf, the graphical user interface comprising a first cell and a second cell under the hightime column, the first cell corresponding to the first row and the first turf, the second cell corresponding to the second row and the second turf;

determining whether at least one of a plurality of technicians exceeds an allotted time with which to complete a job;

in response to determining that at least one of the plurality of technicians exceeds the allotted time incrementing (a) a first numeric value when the at least one of the plurality of technicians that exceeds the allotted time is assigned to the first turf and (b) a second numeric value when the at least one of the plurality of technicians that exceeds the allowed time is assigned to the second turf;

displaying the first numeric value within the first cell of the graphical user interface; and displaying the second numeric value within the second cell of the graphical user interface, wherein the first cell displays a first highlight when the first numeric indicator indicates that none of the plurality of technicians assigned to the first turf exceeds the allotted time;

wherein the first cell displays a second highlight when the first numeric indicator indicates that at least one of the plurality of technicians assigned to the first turf exceeds the allotted time:

wherein the second cell displays the first highlight when the second numeric indicator indicates that none of the plurality of technicians assigned to the second turf exceeds the allotted time; and wherein the second cell displays the second highlight when the second numeric indicator indicates that at least one of the plurality of technicians assigned to the second turf exceeds the allotted time.

11. The computer-readable medium of claim 10, determining whether at least one of a plurality of technicians exceeds an allotted time with which to complete a job comprises:

for at least one of plurality of technicians, determining a difference between a current time and a time dispatched to the job;

determining whether the difference is greater than the allotted time; and determining that at least one of the plurality of technicians exceeds the allotted time if the difference between the current time and the time dispatched to the job is greater than the allotted time.

12. The computer-readable medium of claim 10, wherein the allotted time is dependent on a type of job that is completed.

13. The computer-readable medium of claim 10, wherein the first numeric indicator comprises a first aggregate number of the plurality of technicians assigned to the first turf that exceed the allotted time; and wherein the second numeric indicator comprises a second aggregate number of the plurality of technicians assigned to the second turf that exceed the allotted time.

14. The computer-readable medium of claim 10, the method further comprising:

receiving via an input device, a first user selection of the first cell;

in response to receiving the first user selection of the first cell, displaying a first window within the graphical user interface, the first window displaying a name, a time of dispatch, an amount of time on the job, and the allotted time for each of the at least one of the plurality of technicians assigned to the first turf that exceeds the allotted time;

receiving, via the input device, a second user selection of the second cell; and in response to receiving the second user selection of the second cell, displaying a second window within the graphical user interface, the second window displaying the name, the time of dispatch, the amount of time on the job, and the allotted time for each of the at least one of the plurality of technicians assigned to the second turf that exceeds the allotted time.

\* \* \* \* \*

UNITED STATES PATENT AND TRADEMARK OFFICE
CERTIFICATE OF CORRECTION

PATENT NO.        : 8,069,072 B2                                Page 1 of 1
APPLICATION NO.   : 11/779054
DATED             : November 29, 2011
INVENTOR(S)       : Ingman et al.

It is certified that error appears in the above-identified patent and that said Letters Patent is hereby corrected as shown below:

In Claim 5, Column 13, Line 10, after the words "amount of time" please insert --on the job, and--.

In Claim 6, Column 13, Line 32, after the words "allotted time," please insert --increment--.

In Claim 10, Column 14, Line 48, after the words "allotted time" please insert --,--.

Signed and Sealed this
Third Day of January, 2012

David J. Kappos
*Director of the United States Patent and Trademark Office*